US012589747B2

(12) United States Patent
Moore et al.

(10) Patent No.: US 12,589,747 B2
(45) Date of Patent: Mar. 31, 2026

(54) VEHICLE CONTROL SYSTEMS FOR AUTOMATED VEHICLE PLATOON DRIVING

(71) Applicant: GM GLOBAL TECHNOLOGY OPERATIONS LLC, Detroit, MI (US)

(72) Inventors: Joseph K. Moore, Whitby (CA); Mansoor Alghooneh, Richmond Hill (CA); Amin Habibnejad Korayem, Oshawa (CA); Grant L Meade, Whitby (CA); Hasan Alper Hepguvendik, Milton (CA); Hojjat Izadi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 18/491,230

(22) Filed: Oct. 20, 2023

(65) Prior Publication Data

US 2025/0128711 A1     Apr. 24, 2025

(51) Int. Cl.
*B60W 30/00* (2006.01)
*B60W 10/04* (2006.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC .... B60W 30/165; B60W 10/04; B60W 10/18; B60W 10/20; B60W 2420/403;
(Continued)

(56) References Cited

U.S. PATENT DOCUMENTS

2019/0188495 A1   6/2019   Zhao et al.
2019/0206261 A1*  7/2019   Szymczak ................ G08G 1/22
(Continued)

FOREIGN PATENT DOCUMENTS

DE     102018220293 A1    5/2020
DE     102019204783 A1   10/2020
DE     102019210664 A1    1/2021

OTHER PUBLICATIONS

U.S. Appl. No. 18/298,460, filed Apr. 11, 2023, Korayem et al.
(Continued)

*Primary Examiner* — Russell Frejd
*Assistant Examiner* — Brittany Renee Peko

(57)     ABSTRACT

A method for automated vehicle driving control in a platoon includes obtaining first operational parameters of a first vehicle, including at least a first measured braking performance of the first vehicle, obtaining second operational parameters of a second vehicle, including at least a first measured braking performance of the second vehicle, determining a platoon sequence according to the operational parameters by assigning whichever of the first vehicle and the second vehicle that has a lesser measured braking performance as a lead vehicle in the platoon sequence, and assigning the other of the first vehicle and the second vehicle as a follower vehicle in the platoon sequence, initiating a platoon sequence driving route, and controlling automated driving of the follower vehicle according to tracking of the lead vehicle, wherein the automated driving includes automated steering control, automated acceleration and automated braking based on tracked movement of the lead vehicle.

20 Claims, 6 Drawing Sheets

(51) Int. Cl.
| | |
|---|---|
| *B60W 10/18* | (2012.01) |
| *B60W 10/20* | (2006.01) |
| *B60W 30/165* | (2020.01) |
| *G08G 1/00* | (2006.01) |

(52) U.S. Cl.
CPC ....... *B60W 10/20* (2013.01); *B60W 2420/403* (2013.01); *B60W 2510/18* (2013.01); *B60W 2510/244* (2013.01); *B60W 2530/10* (2013.01); *B60W 2530/20* (2013.01); *B60W 2554/4042* (2020.02); *B60W 2554/802* (2020.02); *B60W 2710/18* (2013.01); *B60W 2710/20* (2013.01); *B60W 2720/106* (2013.01); *G08G 1/22* (2013.01)

(58) Field of Classification Search
CPC ....... B60W 2510/18; B60W 2510/244; B60W 2530/10; B60W 2530/20; B60W 2554/4042; B60W 2554/802; B60W 2710/18; B60W 2710/20; B60W 2720/106; G08G 1/22; G05B 19/0423; G05B 2219/25257
See application file for complete search history.

(56) References Cited

U.S. PATENT DOCUMENTS

| | | | | |
|---|---|---|---|---|
| 2019/0382011 | A1* | 12/2019 | Bae ..................... | B60W 30/162 |
| 2020/0388164 | A1* | 12/2020 | Domprobst .............. | G08G 1/22 |
| 2021/0094542 | A1* | 4/2021 | Horiguchi .............. | B60T 7/042 |
| 2021/0139008 | A1 | 5/2021 | DioGioacchino et al. | |
| 2025/0004472 | A1* | 1/2025 | Luckevich ........... | G05D 1/0295 |

OTHER PUBLICATIONS

U.S. Appl. No. 18/304,903, filed Apr. 21, 2023, Moore et al.
German Office Action from counterpart DE1020231356771, dated Aug. 22, 2024.

* cited by examiner

200

220

140

102

104

122

134

120

132

VEHICLE CONTROL SYSTEMS FOR AUTOMATED VEHICLE PLATOON DRIVING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems for automated vehicle platoon driving, including methods of sequencing vehicles in an automated platoon.

Mixed traffic conditions represent a challenging environment for autonomous vehicles, including a leader and follower semi-autonomous implementation where unmanned vehicles/pods closely follow a leader vehicle. The leader vehicle makes higher-level path planning decisions, and the follower vehicle follows the leader safely. In order to enable this functionality, the vehicles are closely coupled together to ensure that the follower vehicle is only following the leader vehicle. Each vehicle in this platoon may have different braking performance (stopping distance), different tire characteristics (mu) and different payloads. In the event that the lead vehicle needs to rapidly apply the brakes, it is desirable for the follower vehicle to avoid impacting the leader vehicle.

SUMMARY

A method for automated vehicle driving control in a platoon includes obtaining first operational parameters of a first vehicle, the first vehicle including a first front vehicle sensor and a first vehicle control module configured to control automated driving of the first vehicle, the first operational parameters including at least a first measured braking performance of the first vehicle, obtaining second operational parameters of a second vehicle, the second vehicle including a second front vehicle sensor and a second vehicle control module configured to control automated driving of the second vehicle, the second operational parameters including at least a first measured braking performance of the second vehicle, determining a platoon sequence according to the first operational parameters and the second operational parameters, by assigning whichever of the first vehicle and the second vehicle that has a lesser measured braking performance as a lead vehicle in the platoon sequence, and assigning the other of the first vehicle and the second vehicle as a follower vehicle in the platoon sequence, initiating a platoon sequence driving route, and controlling automated driving of the follower vehicle according to tracking of the lead vehicle, wherein the automated driving includes automated steering control, automated acceleration and automated braking based on tracked movement of the lead vehicle.

In other features, the method includes prior to controlling automated driving of the follower vehicle according to tracking of the lead vehicle, executing a first performance test of the first vehicle to obtain updated first operational parameters, the first performance test including measuring current braking performance of the first vehicle, executing a second performance test of the second vehicle to obtain updated second operational parameters, the second performance test including measuring current braking performance of the second vehicle, and revising the platoon sequence in response to the updated first operational parameters and the updated second operational parameters indicating that the lead vehicle has a stronger measured braking performance than the follower vehicle.

In other features, the method includes during controlling automated driving of the follower vehicle, periodically obtaining updated first operational parameters, the updated first operational parameters including measuring current braking performance of the first vehicle, periodically obtaining updated second operational parameters, the updated second operational parameters including measuring current braking performance of the second vehicle, determining a difference in measured current braking performance between the lead vehicle and the follower vehicle, and revising at least one of the platoon sequence, a platooning following distance or a speed of the lead vehicle, in response to the difference exceeding a specified sequence change threshold indicating that the lead vehicle has a stronger measured braking performance than the follower vehicle.

In other features, the first operational parameters include at least one of a state of charge of a battery of the first vehicle, a load of the first vehicle, an acceleration performance of the first vehicle, a fuel range of the first vehicle, or an aerodynamic profile of the first vehicle.

In other features, the method includes controlling automated driving of the lead vehicle according to the platoon sequence driving route, wherein the automated driving includes automated steering control, automated acceleration and automated braking based on a specified navigational route to a target destination.

In other features, determining the platoon sequence includes determining the platoon sequence according to at least one of measured acceleration performance of the first vehicle and the second vehicle, a driving ranges of the first vehicle and the second vehicle, or a platoon exit order of the first vehicle and the second vehicle.

In other features, the method includes obtaining third operational parameters of a third vehicle, the third vehicle including a third front vehicle sensor and a third vehicle control module configured to control automated driving of the third vehicle, the third operational parameters including at least a first measured braking performance of the third vehicle, and assigning the third vehicle in the platoon sequence at a position relative to the first vehicle and the second vehicle according to the third operational parameters.

In other features, the second vehicle is a mobile video surveillance system (MVSS) vehicle including at least one of a drive by wire subsystem, a steer by wire subsystem, and a brake by wire subsystem, and the second vehicle control module is configured to control at least one of the drive by wire subsystem, the steer by wire subsystem, and the brake by wire subsystem, according to an input received from the second front vehicle sensor, and increasing a following distance between the first vehicle and the second vehicle when the first vehicle and the second vehicle share connected data, the follower vehicle has cruise control activated, and the follower vehicle has a determined inferior braking performance compared to the lead vehicle.

In other features, the method includes the first operational parameters include an axle load assessment and a tire grip assessment.

In other features, the method includes the axle load assessment includes a static weight estimation of the first vehicle, and a longitudinal dynamic model for the first vehicle, the tire grip assessment includes a remaining tire tread of the first vehicle, a road surface type, and a tire type, and the first measured braking performance includes a normal load estimation of the first vehicle and a monitored brake pad wear value of the first vehicle.

A system for automated vehicle driving control in a platoon includes a first vehicle including a first front vehicle sensor and a first vehicle control module configured to control automated driving of the first vehicle, the first vehicle control module configured to obtain first operational parameters including at least a first measured braking performance of the first vehicle, a second vehicle including a second front vehicle sensor and a second vehicle control module configured to control automated driving of the second vehicle, the second vehicle control module configured to obtain second operational parameters including at least a first measured braking performance of the second vehicle, and a platoon sequence control module configured to determine a platoon sequence according to the first operational parameters and the second operational parameters, by assigning whichever of the first vehicle and the second vehicle that has a lesser measured braking performance as a lead vehicle in the platoon sequence, and assigning the other of the first vehicle and the second vehicle as a follower vehicle in the platoon sequence, and initiate a platoon sequence driving route, wherein the follower vehicle is configured to operate via automated driving according to tracking of the lead vehicle, wherein the automated driving includes automated steering control, automated acceleration and automated braking based on tracked movement of the lead vehicle.

In other features, the method includes the platoon sequence control module is configured to, prior to controlling automated driving of the follower vehicle according to tracking of the lead vehicle, execute a first performance test of the first vehicle to obtain updated first operational parameters, the first performance test including measuring current braking performance of the first vehicle, execute a second performance test of the second vehicle to obtain updated second operational parameters, the second performance test including measuring current braking performance of the second vehicle, and revise the platoon sequence in response to the updated first operational parameters and the updated second operational parameters indicating that the lead vehicle has a stronger measured braking performance than the follower vehicle.

In other features, the platoon sequence control module is configured to during controlling automated driving of the follower vehicle, periodically obtain updated first operational parameters, the updated first operational parameters including measuring current braking performance of the first vehicle, periodically obtain updated second operational parameters, the updated second operational parameters including measuring current braking performance of the second vehicle, determine a difference in measured current braking performance between the lead vehicle and the follower vehicle, and revise at least one of the platoon sequence, a platooning following distance or a speed of the lead vehicle, in response to the difference exceeding a specified sequence change threshold indicating that the lead vehicle has a stronger measured braking performance than the follower vehicle.

In other features, the first operational parameters include at least one of a state of charge of a battery of the first vehicle, a load of the first vehicle, an acceleration performance of the first vehicle, a fuel range of the first vehicle, or an aerodynamic profile of the first vehicle.

In other features, the lead vehicle is configured to control automated driving of the lead vehicle according to the platoon sequence driving route, and the automated driving includes automated steering control, automated acceleration and automated braking based on a specified navigational route to a target destination.

In other features, determining the platoon sequence includes determining the platoon sequence according to at least one of measured acceleration performance of the first vehicle and the second vehicle, a driving ranges of the first vehicle and the second vehicle, or a platoon exit order of the first vehicle and the second vehicle.

In other features, the platoon sequence control module is configured to obtain third operational parameters of a third vehicle, the third vehicle including a third front vehicle sensor and a third vehicle control module configured to control automated driving of the third vehicle, the third operational parameters including at least a first measured braking performance of the third vehicle, and assign the third vehicle in the platoon sequence at a position relative to the first vehicle and the second vehicle according to the third operational parameters.

In other features, the second vehicle is a mobile video surveillance system (MVSS) vehicle including at least one of a drive by wire subsystem, a steer by wire subsystem, and a brake by wire subsystem, and the second vehicle control module is configured to control at least one of the drive by wire subsystem, the steer by wire subsystem, and the brake by wire subsystem, according to an input received from the second front vehicle sensor, and increase a following distance between the first vehicle and the second vehicle when the first vehicle and the second vehicle share connected data, the follower vehicle has cruise control activated, and the follower vehicle has a determined inferior braking performance compared to the lead vehicle.

In other features, the first operational parameters include an axle load assessment and a tire grip assessment.

In other features, the axle load assessment includes a static weight estimation of the first vehicle, and a longitudinal dynamic model for the first vehicle, the tire grip assessment includes a remaining tire tread of the first vehicle, a road surface type, and a tire type, and the first measured braking performance includes a normal load estimation of the first vehicle and a monitored brake pad wear value of the first vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In a vehicle platoon lead-follow (LF) architecture, each vehicle in the platoon may be capable of autonomous driving, such as a mobile video surveillance system (MVSS) certified motor vehicle having a drive by wire subsystem, a steer by wire subsystem, and a brake by wire subsystem. These subsystems may be directed by a leader-follower feature controller which is supported by a perception/path planning subsystem (e.g., as part of a vehicle control module).

Additional sensed data from the vehicle, such as weight distribution and estimated road tire grip, may be utilized to determine vehicle performance values. In a general case, each vehicle in the platoon may be considered for assigning as a lead vehicle or a follower vehicle.

In order to facilitate a close-coupled following distance, it may be desirable to select a vehicle having the best braking capability as a follower vehicle. The braking capabilities may account for a current mass of the vehicle, a current road surface, etc. When a vehicle follower function is selected at the beginning of a platoon automated driving route (e.g., via a remote interface, through a connected interface, within a vehicle interface, etc.), a platoon vehicle sequencing module may use specified current vehicle performance tests in combination with a previously stored measured performance results from prior operation cycles of the vehicles, and knowledge of a travel route of the platoon to the target destination, in order to assign a preferred lead vehicle.

In some example embodiments, historical vehicle performance data may be stored locally, via a cloud-based storage system, etc., and each vehicle may provide connectivity to transmit measured vehicle operational parameters to the storage. The platoon vehicle sequencing module may provide an indication of an assigned lead vehicle to a user via a local user interface display, through the cloud network to another user interface of a mobile computing device, etc. Once the lead vehicle is selected, braking performance of each vehicle may be continually monitored, and if braking performance changes (e.g., due to cargo unloaded during the route, etc.), those changes may cause a resequencing of the preferred lead vehicle. This may generate an alert to the driver (or an automated platoon of vehicles), of a need to re-sequence the order of vehicles in the platoon.

Figure 1:
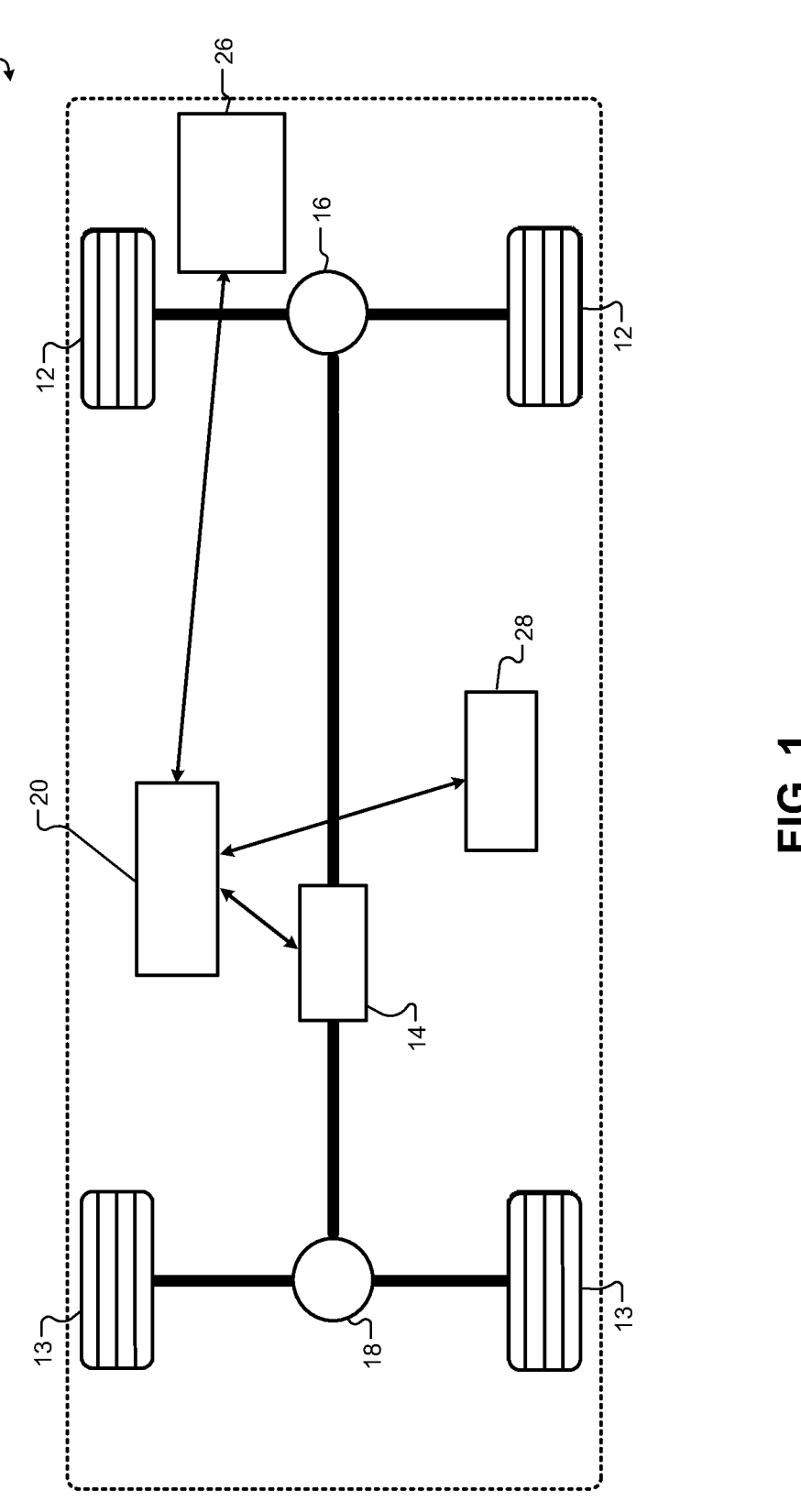
FIG. 1 is a diagram of an example vehicle including a front vehicle sensor for driving in an automated vehicle platoon.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, a vehicle camera, a braking system, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors 28 (such as cameras, microphones, pressure sensors, wheel position sensors, brake sensors, location sensors such as global positioning system (GPS) antennas, etc.). Some sensors may be configured to monitor current motion of the vehicle, acceleration of the vehicle, braking of the vehicle, steering torque, etc.

As shown in FIG. 1, the vehicle 10 includes a front vehicle sensor 26, configured to detected objects in front of the vehicle 10. For example, the front vehicle sensor 26 may include one or more cameras, lasers, lidar systems, etc., configured to detect or identify objects in front of the vehicle, such as other target vehicles (e.g., closest in path vehicles).

In some example embodiments, the front vehicle sensor 26 may be used for automated driving control (e.g., of automated steering, braking, acceleration, etc.) to follow a lead vehicle in an automated vehicle driving platoon. In various implementations, the vehicle 10 may include an optional rear vehicle camera, an optional side vehicle camera, etc.

The vehicle control module 20 may be configured to control movement of the vehicle 10 based on tracked movement of a lead vehicle in the driving platoon (or another vehicle in the platoon immediately ahead of the vehicle 10), such as by increasing or decreasing automated acceleration of the vehicle 10 to keep up with the lead vehicle, automatically applying brakes of the vehicle 10 when the lead vehicle slows down, steering the vehicle 10 to follow a driving route of the lead vehicle, etc.

The vehicle control module 20 may communicate with another device (such as another vehicle in the automated vehicle driving platoon) via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

Figure 2:
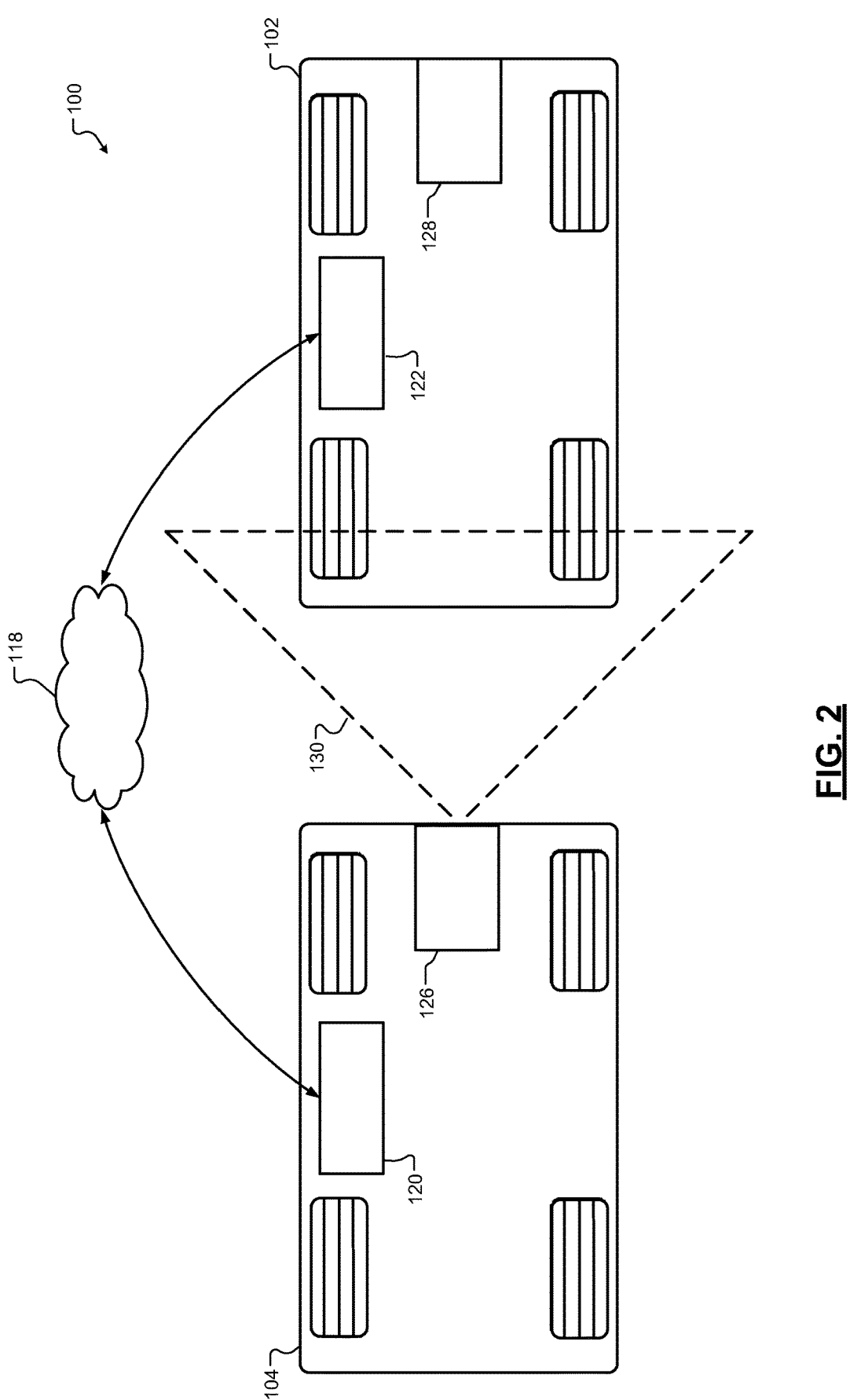
FIG. 2 is a block diagram of multiple vehicles driving in an automated vehicle platoon.

FIG. 2 is a block diagram of multiple vehicles driving in an automated vehicle platoon 100. The lead vehicle 102 includes a vehicle control module 122 and a front vehicle sensor 128, and the follower vehicle 104 includes a vehicle control module 120 and a front vehicle sensor 126.

The follower vehicle 104 is configured to use the front vehicle sensor 126 to track lead vehicle via a detection range 130, in order to follow movement of the lead vehicle 102 using automated driving (e.g., automated control of steering, acceleration and braking of the follower vehicle 104).

In some implementations, each vehicle may be a mobile video surveillance system (MVSS) certified motor vehicle, which includes a drive by wire subsystem, a steer by wire subsystem, and a brake by wire subsystem. The follower vehicle 104 is configured to follow the lead vehicle 102 in a platoon driving route, where the follower vehicle 104 may follow closely to the lead vehicle 102 (e.g., one meter behind the lead vehicle 102, three meters behind the lead vehicle 102, etc.), in order to avoid other vehicles on the road from cutting between the lead vehicle 102 and the follower vehicle 104.

The platoon may be fully autonomous where both the follower vehicle 104 and the lead vehicle use fully auto-mated driving (e.g., by the lead vehicle 102 following a specified navigational route to a target destination). The platoon may be semi-autonomous, where a human manually drives the lead vehicle 102, but the follower vehicle 104 is configured to use automated driving to follow the lead vehicle 102.

In some implementations, the lead vehicle 102 and the follower vehicle 104 may communicate with one another via vehicle-to-vehicle (V2V) communication 118. This may allow the lead vehicle 102 to communicate braking events, acceleration events, steering events, etc. to the follower vehicle 104 in real time, so the follower vehicle 104 does not have to rely on only tracking detection via the front vehicle sensor 126. Although FIG. 2 illustrates only two vehicles, other embodiments may include more vehicles arranged in a line for platoon sequencing, where each vehicle follows the vehicle immediately ahead of it in the sequence (except for the lead vehicle).

Figure 3:
FIG. 3 is a block diagram illustrating an example vehicle sequencing module for determining a platoon sequence of multiple automated driving vehicles.

FIG. 3 is a block diagram illustrating an example vehicle sequencing module for determining a platoon sequence 200 of multiple automated driving vehicles. As shown in FIG. 3, the lead vehicle 102 includes vehicle sensors 134, and the follower vehicle 104 includes vehicle sensors 132.

The vehicle control module 122 is configured to obtain operational parameters of the lead vehicle 102 via the vehicle sensors 134 (such as measured braking performance, etc.), and provide the operational parameters to the platoon vehicle sequencing module 140 via a cloud network 220. The vehicle control module 120 is configured to obtain operational parameters of the follower vehicle 104 via the vehicle sensors 134, and provide the operational parameters to the platoon vehicle sequencing module 140 via the cloud network 220.

The platoon vehicle sequencing module 140 is configured to determine a platoon sequence for the vehicles, based on the obtained operational parameters of the vehicles. For example, the platoon vehicle sequencing module 140 may be configured to assign a vehicle having the worst braking performance as a lead vehicle, to reduce the possibility of a follower vehicle hitting the lead vehicle. Further details of an example process for determining a platooning sequence are described further below with reference to FIGS. 4 and 5.

Figure 4:
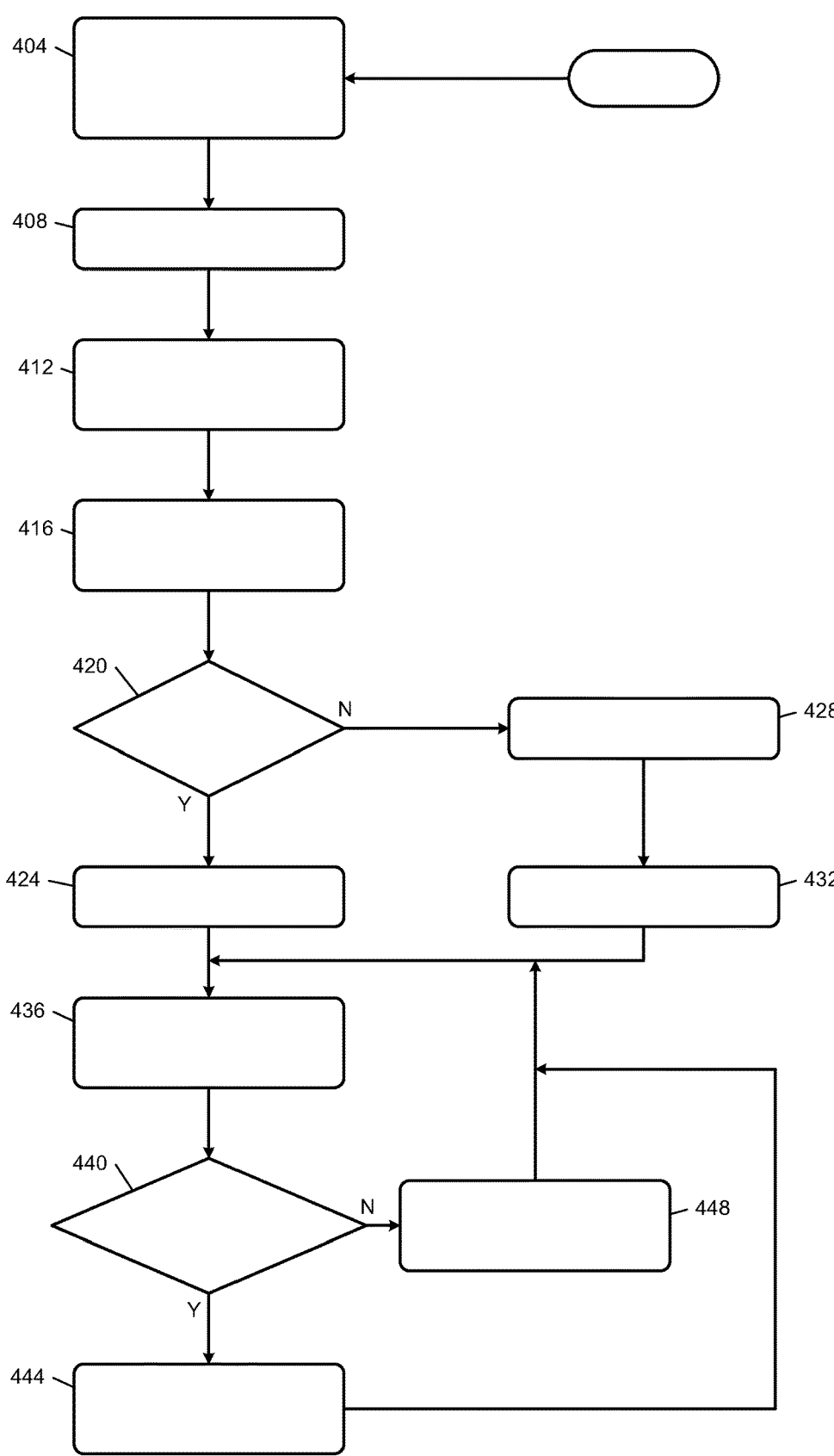
FIG. 4 is a flowchart depicting an example process for sequencing vehicles in an automated vehicle driving platoon.

FIG. 4 is a flowchart depicting an example process for sequencing vehicles in an automated vehicle driving pla-toon. The process illustrated in FIG. 4 may be performed by, for example, one or more of the vehicle control modules 20, 120 and 122 of FIGS. 1 and 2, and the platoon vehicle sequencing module 140 of FIG. 3.

At 404, the process begins by performing dynamic vehicle performance assessments of each vehicle in the platoon. For example, the vehicle sensors 28 of FIG. 1 may obtain a braking performance of the vehicle 10, a tire grip level of the vehicle 10, a state of charge of a battery of the vehicle 10, a load of the vehicle 10, an acceleration perfor-mance of the vehicle 10, a fuel range of the vehicle 10, an aerodynamic profile of the vehicle 10, etc.

In some implementations, the vehicle control module 20 may obtain operational parameters of the vehicle 10 via the vehicle sensors 28, which may include some or all of the above measured vehicle performance values (or others). Some operational parameters may be stored for a vehicle, and accessed by the vehicle control module 20.

At 408, the controller is configured to initiate a vehicle follow mode. The vehicle follow mode may include an automated vehicle platoon, where one vehicle is selected as a lead vehicle, and other vehicles are assigned as follower vehicles in a platoon sequence, to follow the lead vehicle via automated driving.

At 412, the controller is configured to determine an initial sequence of the vehicle platoon. Further details of deter-mining the initial platoon sequence are described further below with reference to the example of FIG. 5. In some implementations, determining the initial sequence may include assigning the vehicle having the worst braking performance as the lead vehicle in the platoon sequence.

The vehicle control module is configured to optionally perform a braking maneuver assessment prior to the start of the platooning route drive. For example, each vehicle may execute a controlled acceleration and braking test over the same road surface to measure a stopping distance of the vehicle. This test may confirm whether any previous braking assessments have changed due to, for example, a reduction in braking performance since a last measurement, an increased load of the vehicle, different braking performance on a different road surface, etc.

At 420, the vehicle control module is configured to determine whether the initial assessment test for each vehicle supports the initial sequence determined at 412. For example, control determines whether any currently mea-sured performance characteristics of the vehicles are differ-ent enough from the originally obtained parameters to indicate that the initial platoon sequence should be changed.

If a follower vehicle is determined to have a worse braking performance than the lead vehicle at 420, control proceeds to 428 to re-sequence the vehicles based on the assessment (e.g., move the follower vehicle with the worst measured braking performance in the braking maneuver test of 416 to become the lead vehicle). Control then starts the automated vehicle platooning with the updated sequence at 432.

If control determines at 420 that the original platoon sequence was correct (e.g., the braking maneuver tests performed at 416 are consistent with the original platoon sequence), control proceeds to 424 to start vehicle platooning with the current sequence. Initiating the automated vehicle platooning may include starting travel of the lead vehicle along a specified platoon route towards a target destination, with one or more platoon vehicles following the lead vehicle via automated driving.

At 436, control is configured to continue performing dynamic assessments of each vehicle during the platooning trip. For example, vehicle control modules may continue to collect operational parameters such as braking performance and acceleration performance, while each vehicle is driving along the platooning route.

Periodically (e.g., every minute, every ten minutes, every hour, etc.), control may perform a dynamic assessment to determine whether re-sequencing is needed at 440. For example, control may compare a difference between dynamically monitored braking performance of the lead vehicle and the follower vehicle, to determine whether the platoon sequence should be changed.

In various implementations, control may compare the difference to a specified threshold (e.g., a re-sequencing threshold indicating that a different in performance between a lead and follower vehicle is significant enough that the vehicles should be re-sequenced. For example, control may proceed to 444 to re-sequence the vehicles if a dynamically determined difference indicates the follower vehicle currently has a worse braking performance than the lead vehicle, a five percent worse braking performance than the lead vehicle, a ten percent worse braking performance, etc. Control then returns to 436 to continue performing dynamic performance assessments during the automated platooning drive. If the assessment difference is below the specified re-sequencing threshold, but the follower vehicle still has a worse assessed performance than the lead vehicle, control may proceed to 448 to dynamically adjust the following distance between the leader and follower vehicles to account for the worse stopping distance performance of the follower vehicle, and/or transmit a signal to the lead vehicle to reduce speed.

Figure 5:
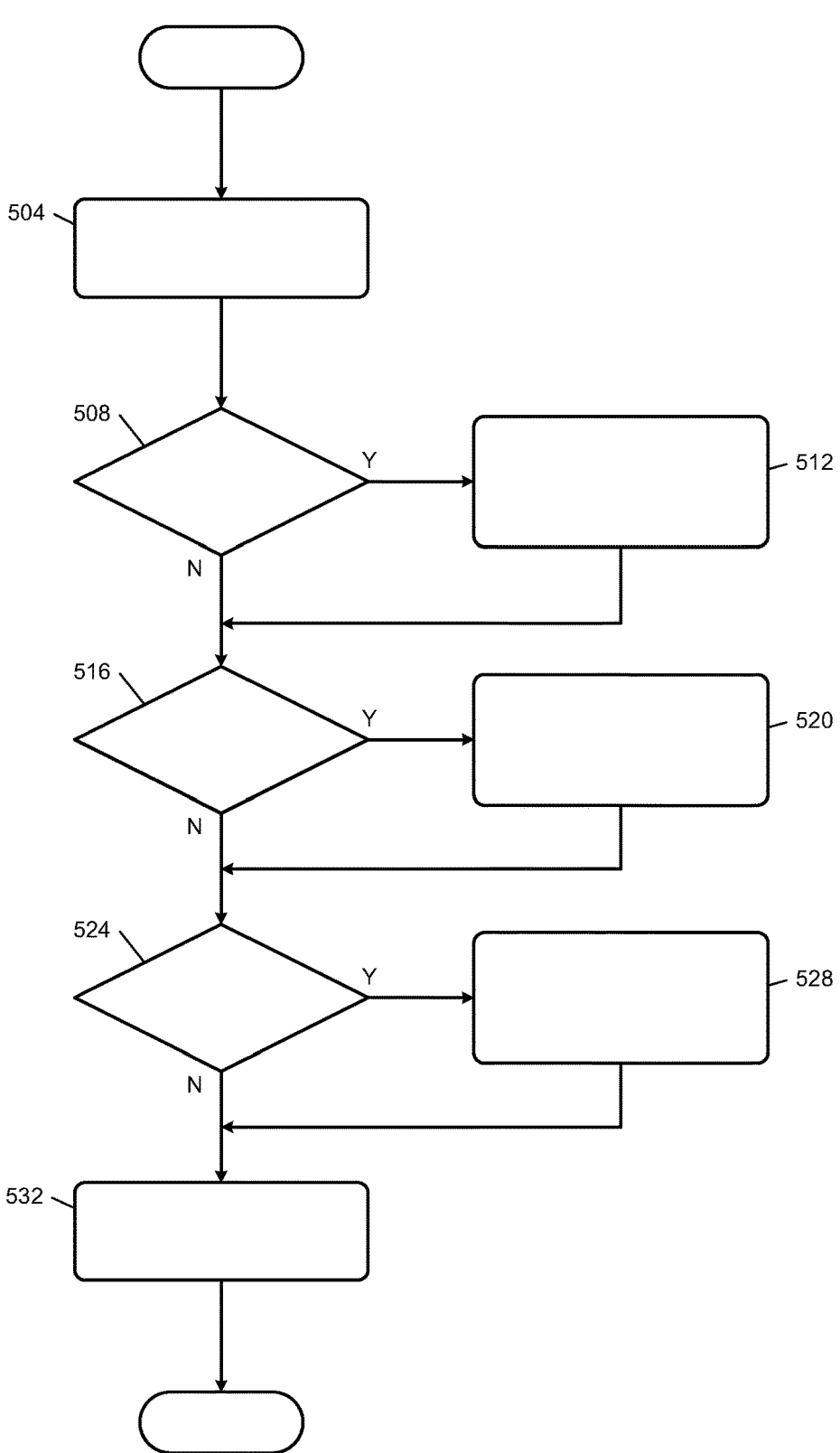
FIG. 5 is a flowchart depicting an example process for determining a sequence of vehicles in the process of FIG. 4.

FIG. 5 is a flowchart depicting an example process for determining a sequence of vehicles in the process of FIG. 4 (such as at step 412 of FIG. 5). At 504, the process begins by arranging the vehicles in a platooning sequence from the longest stopping distance (e.g., lead vehicle) to the shortest stopping distance (e.g., follower vehicle). Vehicle braking performance may be considered as a first tier criteria for safety reasons in some implementations.

At 508, the platoon vehicle sequencing module 140 is configured to determine whether the platoon sequencing will be modified based on acceleration and/or deceleration. For example, various factors may be used to determine a sequence of the vehicles, including acceleration and/or deceleration performance of each vehicle.

If acceleration and/or deceleration may be used for vehicle sequencing, control proceeds to 512 to selectively adjust the sequence prioritization according to vehicle acceleration and/or deceleration performance, by assigning a preference for a slowest accelerating and/or decelerating vehicle to be the lead vehicle and faster accelerating and/or decelerating vehicles to be follower vehicles (e.g., such that the lead vehicle will not drive too far ahead of a follower vehicle). In some implementations, the vehicle acceleration and/or deceleration may only be used as a tiebreaker after vehicle braking sequencing, where vehicle acceleration and/or deceleration is only used to sequence vehicles having equal braking performance.

In other implementations, weights may be assigned to each sequencing parameter rank. For example, a vehicle with five percent better braking performance relative to another vehicle may be assigned as the lead vehicle anyways if it has fifty percent worse acceleration and/or deceleration performance.

At 516, control determines whether the platoon sequence may be determined at least in part based on driving range. If so, control proceeds to 520 to selectively adjust the platoon sequence prioritization according to a longest to shortest driving range. For example, a vehicle having a longer estimated driving range (e.g., due to a greater battery charge, larger fuel tank, more aerodynamic profile, etc.), may be assigned as the lead vehicle in order to take on the largest aerodynamic load and preserve the shorter driving range of follower vehicles.

At 524, control determines whether the platoon sequence may be determined at least in part based on convenience. If so, control proceeds to 528 to selectively adjust sequence prioritization based on, e.g., an order of vehicles leaving the platoon. For example, vehicles that will not be traveling as far along the route as other vehicles may be assigned to a follower role, in order to make it easier to drop a follower vehicle from the platoon at a future point in time. Control then sets the initial platoon sequence based on the selected sequencing factors at 532.

Figure 6:
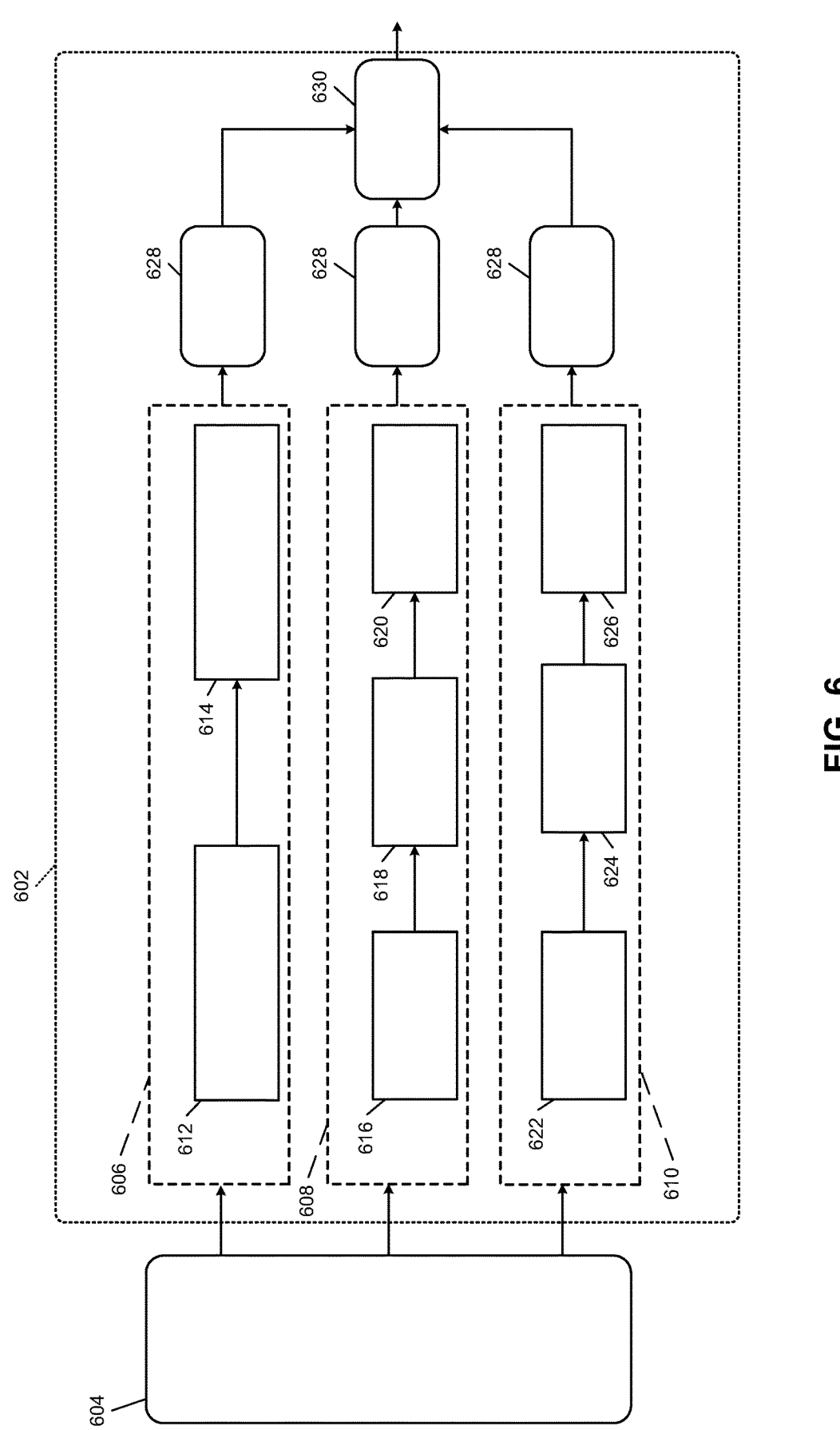
FIG. 6 is a block diagram illustrating example vehicle assessment modules for obtaining vehicle parameters to determine automated vehicle platoon sequencing.

FIG. 6 is a block diagram illustrating example vehicle assessment modules for obtaining vehicle parameters to determine automated vehicle platoon sequencing. The vehicle platooning sequence module 602 is configured to receive vehicle parameters, such as a wheel speed of the vehicle, a steering wheel angle a longitudinal velocity, a lateral velocity, a vehicle traction value, a brake torque value, a tire wear assessment value, a brake pad sensor wear value, a suspension height sensor value, etc.

The vehicle platoon sequencing module 602 includes an axle load assessment 606, which estimates a static weight of the vehicle via static weight estimation 612, and combines the static weight estimation with a vehicle longitudinal dynamic model 614.

The tire grip assessment 608 is configured to determine a remaining tire tread depth 616, and obtain a surface type 618 of the road (such as whether the road is currently dry, wet, covered in snow, covered in ice, etc.). These values are combined with an obtained type of tire and capacity of the tires at 620.

The braking performance assessment 610 is configured to estimate a normal load of the vehicle via normal load estimation 622, and obtain a monitored brake pad wear 624 (e.g., via one or more brake pad sensors). These values may be combined with a braking performance value 626, such as a measured stopping distance of the vehicle from a specified speed.

An environment classifier 628 may be applied to each of the assessments (such as whether driving conditions are currently rainy, icy, dry, snowy, etc.), and the vehicle score generator 630 is configured to combine the classified assessment values to generate an overall performance score for the vehicle. The overall performance score may be used to place the vehicle within a sequence, with higher scoring vehicles near the follower end of the sequence and lower performance score vehicles near a lead of the platoon sequence.

Each of the assessments may work together by providing key values and distributions such as mass or brake pad performance. The output of each assessment may include a distribution that can be fused together using any suitable algorithm, such as Bayesian fusion, to create a final unified distribution that can be considered as a score given to each vehicle in the platoon. Voting algorithms, such as decision trees, can be applied to the vehicle scores to rank the vehicles in the platoon, based on the worst performing vehicle to the best performing vehicle (e.g., where the vehicle with the worst performance is assigned to be the leader vehicle). An example algorithm for determining a vehicle score based on vehicle brake performance, road surface condition, and vehicle weight, is:

$$v \text{ score}_{avg\ icy} = \frac{1}{N}\sum\nolimits_{i=1}^{N} m_i \frac{|\Delta a_{x_i}|}{\Delta p_i} \text{ for icy brake events}$$

$$v \text{ score}_{avg\ wet} = \frac{1}{M}\sum\nolimits_{i=1}^{M} m_i \frac{|\Delta a_{x_i}|}{\Delta p_i} \text{ for wet brake events}$$

$$v \text{ score}_{avg\ gravel} = \frac{1}{L}\sum\nolimits_{i=1}^{L} m_i \frac{|\Delta a_{x_i}|}{\Delta p_i} \text{ for gravel brake events}$$

where i represents each braking instance, m is a vehicle weight, $a_x$ is a vehicle acceleration, and p is an applied braking percentage. The vehicle score may be considered as an acceleration normalized by applied braking percentage over a braking instance from t1 to t2, where the applied braking percentage $\Delta p$ and vehicle deceleration variation $\Delta a_x$ are calculated along with the determined surface condition.

The vehicles are ranked based on their average $v_{score\_avg}/$m, where m is the current vehicle mass and $v_{score\_avg}$ is the value for the current surface condition. The vehicle with the lowest $v_{score\_avg}/$m is recommended as the lead vehicle, and the vehicle with the highest $v_{score\_avg}/$m is the last vehicle in the platoon. If the platooning occurs on dry roads, the $v_{score\_avg}/$m dry value will be considered. Similarly, if the platooning occurs on icy roads the $v_{score\_avg}/$m icy value will be considered. The surface condition may be determined using any suitable detection technique, such as a vison-based road classifier.

In some implementations, at the start of the platooning drive, a verification of the determined platoon sequence is performed (e.g., a verification braking maneuver is executed). For example, multiple brake stops may be used to estimate and verify stopping distance performance for each vehicle in the leader follower platoon over the same road surface, in order to confirm whether the initial platoon sequencing is correct. An example uses an applied braking percentage versus a deceleration response, to generate vehicle deceleration values within two qualifying deceleration events in order to evaluate and verify the order of the vehicles.

In various implementations, example methods described herein may be used to adjust a following distance for adaptive cruise control, such as by increasing the following distance when vehicles share connected data, when the vehicle following with cruise control has a determined inferior braking performance compared to the lead vehicle, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for automated vehicle driving control in a platoon, the method comprising:
obtaining first operational parameters of a first vehicle, the first vehicle including a first front vehicle sensor and a first vehicle control module configured to control automated driving of the first vehicle, the first operational parameters including at least a first measured braking performance of the first vehicle;
obtaining second operational parameters of a second vehicle, the second vehicle including a second front vehicle sensor and a second vehicle control module configured to control automated driving of the second vehicle, the second operational parameters including at least a first measured braking performance of the second vehicle, wherein the second vehicle is a mobile video surveillance system (MVSS) vehicle including at least one of a drive by wire subsystem, a steer by wire subsystem, and a brake by wire subsystem;
determining a platoon sequence according to the first operational parameters and the second operational parameters, by assigning whichever of the first vehicle and the second vehicle that has a lesser measured braking performance as a lead vehicle in the platoon sequence, and assigning the other of the first vehicle and the second vehicle as a follower vehicle in the platoon sequence;
initiating a platoon sequence driving route;
controlling automated driving of the follower vehicle according to tracking of the lead vehicle, wherein the automated driving includes automated steering control, automated acceleration and automated braking based on tracked movement of the lead vehicle;
controlling, by the second vehicle control module, at least one of the drive by wire subsystem, the steer by wire subsystem, and the brake by wire subsystem, according to an input received from the second front vehicle sensor; and
increasing a following distance between the first vehicle and the second vehicle when the first vehicle and the second vehicle share connected data, the follower vehicle has cruise control activated, and the follower vehicle has a determined inferior braking performance compared to the lead vehicle.

2. The method of claim 1, further comprising:
prior to controlling automated driving of the follower vehicle according to tracking of the lead vehicle, executing a first performance test of the first vehicle to obtain updated first operational parameters, the first performance test including measuring current braking performance of the first vehicle;
executing a second performance test of the second vehicle to obtain updated second operational parameters, the second performance test including measuring current braking performance of the second vehicle; and
revising the platoon sequence in response to the updated first operational parameters and the updated second operational parameters indicating that the lead vehicle has a stronger measured braking performance than the follower vehicle.

3. The method of claim 2, further comprising:
during controlling automated driving of the follower vehicle, periodically obtaining updated first operational parameters, the updated first operational parameters including measuring current braking performance of the first vehicle;
periodically obtaining updated second operational parameters, the updated second operational parameters including measuring current braking performance of the second vehicle;

determining a difference in measured current braking performance between the lead vehicle and the follower vehicle; and revising at least one of the platoon sequence, a platooning following distance or a speed of the lead vehicle, in response to the difference exceeding a specified sequence change threshold indicating that the lead vehicle has a stronger measured braking performance than the follower vehicle.

4. The method of claim 1, wherein the first operational parameters include at least one of a state of charge of a battery of the first vehicle, a load of the first vehicle, an acceleration performance of the first vehicle, a fuel range of the first vehicle, or an aerodynamic profile of the first vehicle.

5. The method of claim 1, further comprising controlling automated driving of the lead vehicle according to the platoon sequence driving route, wherein the automated driving includes automated steering control, automated acceleration and automated braking based on a specified navigational route to a target destination.

6. The method of claim 1, wherein determining the platoon sequence includes determining the platoon sequence according to at least one of measured acceleration performance of the first vehicle and the second vehicle, a driving ranges of the first vehicle and the second vehicle, or a platoon exit order of the first vehicle and the second vehicle.

7. The method of claim 1, further comprising:

obtaining third operational parameters of a third vehicle, the third vehicle including a third front vehicle sensor and a third vehicle control module configured to control automated driving of the third vehicle, the third operational parameters including at least a first measured braking performance of the third vehicle; and assigning the third vehicle in the platoon sequence at a position relative to the first vehicle and the second vehicle according to the third operational parameters.

8. The method of claim 1, wherein the first operational parameters include an axle load assessment and a tire grip assessment.

9. The method of claim 8, wherein:

the axle load assessment includes a static weight estimation of the first vehicle, and a longitudinal dynamic model for the first vehicle;

the tire grip assessment includes a remaining tire tread of the first vehicle, a road surface type, and a tire type; and the first measured braking performance includes a normal load estimation of the first vehicle and a monitored brake pad wear value of the first vehicle.

10. A system for automated vehicle driving control in a platoon, the system comprising:

a first vehicle including a first front vehicle sensor and a first vehicle control module configured to control automated driving of the first vehicle, the first vehicle control module configured to obtain first operational parameters including at least a first measured braking performance of the first vehicle;

a second vehicle including a second front vehicle sensor and a second vehicle control module configured to control automated driving of the second vehicle, the second vehicle control module configured to obtain second operational parameters including at least a first measured braking performance of the second vehicle, wherein the second vehicle is a mobile video surveillance system (MVSS) vehicle including at least one of a drive by wire subsystem, a steer by wire subsystem, and a brake by wire subsystem;

a platoon sequence control module configured to:

determine a platoon sequence according to the first operational parameters and the second operational parameters, by assigning whichever of the first vehicle and the second vehicle that has a lesser measured braking performance as a lead vehicle in the platoon sequence, and assigning the other of the first vehicle and the second vehicle as a follower vehicle in the platoon sequence; and initiate a platoon sequence driving route, wherein the follower vehicle is configured to operate via automated driving according to tracking of the lead vehicle, wherein the automated driving includes automated steering control, automated acceleration and automated braking based on tracked movement of the lead vehicle, wherein the second vehicle control module is configured to control at least one of the drive by wire subsystem, the steer by wire subsystem, and the brake by wire subsystem, according to an input received from the second front vehicle sensor, and wherein the second vehicle control module is configured to increase a following distance between the first vehicle and the second vehicle when the first vehicle and the second vehicle share connected data, the follower vehicle has cruise control activated, and the follower vehicle has a determined inferior braking performance compared to the lead vehicle.

11. The system of claim 10, wherein the platoon sequence control module is configured to:

prior to controlling automated driving of the follower vehicle according to tracking of the lead vehicle, execute a first performance test of the first vehicle to obtain updated first operational parameters, the first performance test including measuring current braking performance of the first vehicle;

execute a second performance test of the second vehicle to obtain updated second operational parameters, the second performance test including measuring current braking performance of the second vehicle; and revise the platoon sequence in response to the updated first operational parameters and the updated second operational parameters indicating that the lead vehicle has a stronger measured braking performance than the follower vehicle.

12. The system of claim 11, wherein the platoon sequence control module is configured to:

during controlling automated driving of the follower vehicle, periodically obtain updated first operational parameters, the updated first operational parameters including measuring current braking performance of the first vehicle;

periodically obtain updated second operational parameters, the updated second operational parameters including measuring current braking performance of the second vehicle;

determine a difference in measured current braking performance between the lead vehicle and the follower vehicle; and revise at least one of the platoon sequence, a platooning following distance or a speed of the lead vehicle, in response to the difference exceeding a specified sequence change threshold indicating that the lead vehicle has a stronger measured braking performance than the follower vehicle.

13. The system of claim 10, wherein the first operational parameters include at least one of a state of charge of a battery of the first vehicle, a load of the first vehicle, an acceleration performance of the first vehicle, a fuel range of the first vehicle, or an aerodynamic profile of the first vehicle.

14. The system of claim 10, wherein the lead vehicle is configured to control automated driving of the lead vehicle according to the platoon sequence driving route, and the automated driving includes automated steering control, automated acceleration and automated braking based on a specified navigational route to a target destination.

15. The system of claim 11, wherein determining the platoon sequence includes determining the platoon sequence according to at least one of measured acceleration performance of the first vehicle and the second vehicle, a driving ranges of the first vehicle and the second vehicle, or a platoon exit order of the first vehicle and the second vehicle.

16. The system of claim 10, wherein the platoon sequence control module is configured to:

obtain third operational parameters of a third vehicle, the third vehicle including a third front vehicle sensor and a third vehicle control module configured to control automated driving of the third vehicle, the third operational parameters including at least a first measured braking performance of the third vehicle; and assign the third vehicle in the platoon sequence at a position relative to the first vehicle and the second vehicle according to the third operational parameters.

17. The system of claim 10, wherein the first operational parameters include an axle load assessment and a tire grip assessment.

18. The system of claim 17, wherein:

the axle load assessment includes a static weight estimation of the first vehicle, and a longitudinal dynamic model for the first vehicle;

the tire grip assessment includes a remaining tire tread of the first vehicle, a road surface type, and a tire type; and the first measured braking performance includes a normal load estimation of the first vehicle and a monitored brake pad wear value of the first vehicle.

19. A method for automated vehicle driving control in a platoon, the method comprising:

obtaining first operational parameters of a first vehicle, the first vehicle including a first front vehicle sensor and a first vehicle control module configured to control automated driving of the first vehicle, the first operational parameters including at least a first measured braking performance of the first vehicle;

obtaining second operational parameters of a second vehicle, the second vehicle including a second front vehicle sensor and a second vehicle control module configured to control automated driving of the second vehicle, the second operational parameters including at least a first measured braking performance of the second vehicle, wherein the second vehicle is a mobile video surveillance system (MVSS) vehicle including at least one of a drive by wire subsystem, a steer by wire subsystem, and a brake by wire subsystem;

determining a platoon sequence according to the first operational parameters and the second operational parameters, by assigning whichever of the first vehicle and the second vehicle that has a lesser measured braking performance as a lead vehicle in the platoon sequence, and assigning the other of the first vehicle and the second vehicle as a follower vehicle in the platoon sequence;

initiating a platoon sequence driving route;

controlling automated driving of the follower vehicle according to tracking of the lead vehicle, wherein the automated driving includes automated acceleration and automated braking based on tracked movement of the lead vehicle;

controlling, by the second vehicle control module, at least one of the drive by wire subsystem, the steer by wire subsystem, and the brake by wire subsystem, according to an input received from the second front vehicle sensor; and increasing a following distance between the first vehicle and the second vehicle when the first vehicle and the second vehicle share connected data, the follower vehicle has cruise control activated, and the follower vehicle has a determined inferior braking performance compared to the lead vehicle.

20. The method of claim 19, further comprising:

prior to controlling automated driving of the follower vehicle according to tracking of the lead vehicle, executing a first performance test of the first vehicle to obtain updated first operational parameters, the first performance test including measuring current braking performance of the first vehicle;

executing a second performance test of the second vehicle to obtain updated second operational parameters, the second performance test including measuring current braking performance of the second vehicle; and revising the platoon sequence in response to the updated first operational parameters and the updated second operational parameters indicating that the lead vehicle has a stronger measured braking performance than the follower vehicle.

* * * * *